United States Patent [19]
Ado et al.

[11] Patent Number: 5,863,512
[45] Date of Patent: Jan. 26, 1999

[54] PROCESS FOR PREPARING LAYERED ROCK SALT TYPE LITHIUM FERRITE BY MIXED ALKALI HYDROTHERMAL METHOD

[75] Inventors: Kazuaki Ado; Mitsuharu Tabuchi; Hiroyuki Kageyama; Osamu Nakamura, all of Ikeda, Japan

[73] Assignee: Agency of Industrial Science & Technology, Tokyo, Japan

[21] Appl. No.: 959,976

[22] Filed: Oct. 29, 1997

[30]      Foreign Application Priority Data

Nov. 13, 1996  [JP]  Japan .................................. 8-318747

[51] Int. Cl.[6] .............................. C01G 1/00; C01G 37/14; C01D 15/00
[52] U.S. Cl. ...................... 423/138; 423/179.5; 423/596
[58] Field of Search ................................. 423/138, 179.5, 423/596

[56] References Cited

PUBLICATIONS

Ado, K, et al, Preparation of LiFeO2 with alpha–NaFeO2–type structure using a mixed alkaline hydrothermal method., J. of the Electrochemical Society, v. 144, n 7, L177–L180, 1997.

Barriga, C., et al, Lithuim Ferrite Formation by Precipitation from Iron(III) solutions., J. Solid State Chem., 77(1), 132–140, 1988.

*Primary Examiner*—Johann Richter
*Assistant Examiner*—Joseph Murray
*Attorney, Agent, or Firm*—Nikaido Marmelstein Murray & Oram LLP

[57]           ABSTRACT

A process for preparing $LiFeO_2$ having a layered rock salt type structure is characterized in that at least one member selected from the group consisting of water-soluble iron salts, iron hydroxides, iron oxide hydroxides, and metallic iron is subjected to a hydrothermal treatment in an aqueous solution containing lithium hydroxide and at least one of sodium hydroxide and potassium hydroxide at 130° to 300° C.

8 Claims, 3 Drawing Sheets

PROCESS FOR PREPARING LAYERED ROCK SALT TYPE LITHIUM FERRITE BY MIXED ALKALI HYDROTHERMAL METHOD

BACKGROUND OF THE INVENTION

The present invention relates to a process for preparing a lithium ferrite ($LiFeO_2$) powder having a layered rock salt type structure. Such a lithium ferrite powder is useful as a cathode material for use in secondary lithium batteries, and the like.

Lithium cobalt oxide ($LiCoO_2$), lithium nickel oxide ($LiNiO_2$), and solid solutions thereof each having a layered rock salt type ($\alpha$-$NaFeO_2$ type) structure have been studied and developed, and are practically used as cathode materials in secondary lithium batteries now in use as re-chargeable power sources for portable electronic and electric apparatuses. These cathode materials, though high in operating voltage and large in capacity, are however expensive because they contain a rare metal such as Co or Ni. This is therefore a hindrance to extension of the market of secondary lithium batteries wherein they are used (the cost of a cathode material accounts for about ⅓ of the price of a battery).

On the other hand, a lithium manganese spinel such as $LiMn_2O_4$ and lithium ferrite ($LiFeO_2$), which have attracted attention as low-cost 4 V-class cathode materials of the next generation, are under research and development. Lithium ferrite in particular is most expected as a low-cost cathode material of the next generation since it is prepared using Fe as a very rich resource. When this compound is prepared according to a conventional method comprising a solid state reaction of a variety of lithium compound with a trivalent iron compound at 300° to 900° C. [e.g., J. C. Anderson and M. Schieber, J. Phys. Chem. Solids, 25 (1964) 961–968], there is obtained only either $\alpha$-$LiFeO_2$ wherein cations are randomly distributed, or $\gamma$-$LiFeO_2$ having a structure wherein cations are regularly disposed but which is different from that of $LiCoO_2$. In these phases, no route of diffusion of Li during charging or discharging is secured, whereby the compound fails to exhibit cathode characteristics. Accordingly, establishment of a method of preparing layered rock salt type $LiFeO_2$ having the same crystal structure as $LiNiO_2$ or $LiCoO_2$ has been of urgent necessity. Synthesis of this compound is as of now carried out by subjecting $\alpha$-$NaFeO_2$ synthesized by a conventional solid state reaction method to ion exchange in a molten salt containing Li ions [e.g., T. Shirane, R. Kanno, Y. Kawamoto, Y. Takeda, M. Takano, T. Kamiyama and F. Izumi, Solid State Ionics, 79 (1995) 227–233; this will hereinafter be referred to as "Referential Literature"). Since this method requires 2 steps: preparation and ion exchange of $\alpha$-$NaFeO_2$, however, it involves problems such as a difficulty in mass production and a failure in obtaining high-purity crystals. Thus, a novel practical process alternative to this method has been desired.

SUMMARY OF THE INVENTION

An object of the present invention is to provide a novel process for preparing layered rock salt type lithium ferrite according to which process layered rock salt type $LiFeO_2$ as a low-cost cathode material for use in secondary lithium batteries can be mass-produced in the form of high-purity crystals.

As a result of intensive investigations in view of the foregoing problems of the prior art, the inventors of the present invention have succeeded in establishing a technology of preparing layered rock salt type $LiFeO_2$ as one kind of lithium-containing transition metal oxide, expected to be promising as a cathode material of the next generation for use in secondary lithium batteries, according to a hydrothermal treatment method, wherein a specific starting material is used without preparation of $\alpha$-$NaFeO_2$ as an intermediate product.

More specifically, the process of the present invention for preparing layered rock salt type $LiFeO_2$ according to a mixed alkali hydrothermal method is characterized in that at least one of water-soluble iron salts, iron hydroxides, iron oxide hydroxides, and metallic iron is subjected to a hydrothermal treatment in an aqueous solution containing lithium hydroxide and sodium hydroxide and/or potassium hydroxide at 130° to 300° C.

The foregoing hydrothermal treatment of the starting iron source material in the aqueous solution containing lithium hydroxide and sodium hydroxide and/or potassium hydroxide enables layered rock salt type $LiFeO_2$, hitherto hard to prepare at a low cost on an industrial scale, to be mass-produced in the form of high-purity crystals in a single step. Accordingly, the present invention can further promote development of a secondary lithium battery wherein layered rock salt type $LiFeO_2$ is used as the cathode material.

DETAILED DESCRIPTION OF THE PREFERRED EMBODIMENTS

Starting iron source materials usable in the present invention include water-soluble iron salts (nitrates, sulfates, chlorides, etc.), hydroxides, oxide hydroxides ($\alpha$-FeOOH, etc.), and metallic iron. Iron compounds may be either anhydrides or hydrates. Trivalent iron compounds (nitrate, sulfate, chloride, etc.) are preferred as the starting iron source materials. These iron source materials may be used either alone or in combination of at least two thereof.

In the present invention, a water-soluble iron salt as the starting iron source material may be first dissolved in water at a concentration of about 0.05 to 10M, preferably about 0.1 to 1M. The resulting aqueous solution is admixed with lithium hydroxide (usually in an amount of about 1 to 20 mol/kg·$H_2O$, preferably about 5 to 15 mol/kg·$H_2O$, in terms of anhydride) and at least one of sodium hydroxide and potassium hydroxide (usually in an amount of about 10 to 100 mol/kg·$H_2O$, preferably 30 to 60 mol/kg·$H_2O$, in terms of anhydride). Lithium hydroxide, sodium hydroxide and potassium hydroxide may be either anhydrides or hydrates. Subsequently, the resulting mixture is placed still in a hydrothermal reactor (e.g., an autoclave), and then subjected to a hydrothermal reaction. The hydrothermal reaction conditions, though not particularly limited, usually involve a reaction temperature of about 130° to 300° C. and a reaction time of about 0.5 hour to about 14 days (336 hours), and preferably involve a reaction temperature of about 200° to 250° C. and a reaction time of about 1 hour to about 48 hours. After completion of the reaction, the reaction product is washed with water, filtered, and dried for removal of the residual lithium hydroxide and sodium hydroxide and/or potassium hydroxide to obtain the desired layered rock salt type $LiFeO_2$.

Even when an iron hydroxide, and an iron oxide hydroxide or metallic iron is used as the starting iron source material, substantially the same results as in the above case can be obtained. In this case, however, it is preferred that an aqueous solution containing lithium hydroxide and sodium hydroxide and/or potassium hydroxide be previously prepared and then admixed with an iron hydroxide, an iron oxide hydroxide or metallic iron, followed by the hydrothermal reaction of the resulting mixture.

EXAMPLES

The following Examples will more clearly illustrate the features of the present invention. Additionally stated, the crystal phases of samples obtained in Examples were evaluated by Powder X-ray diffractometry.

EXAMPLE 1

Figure 1:
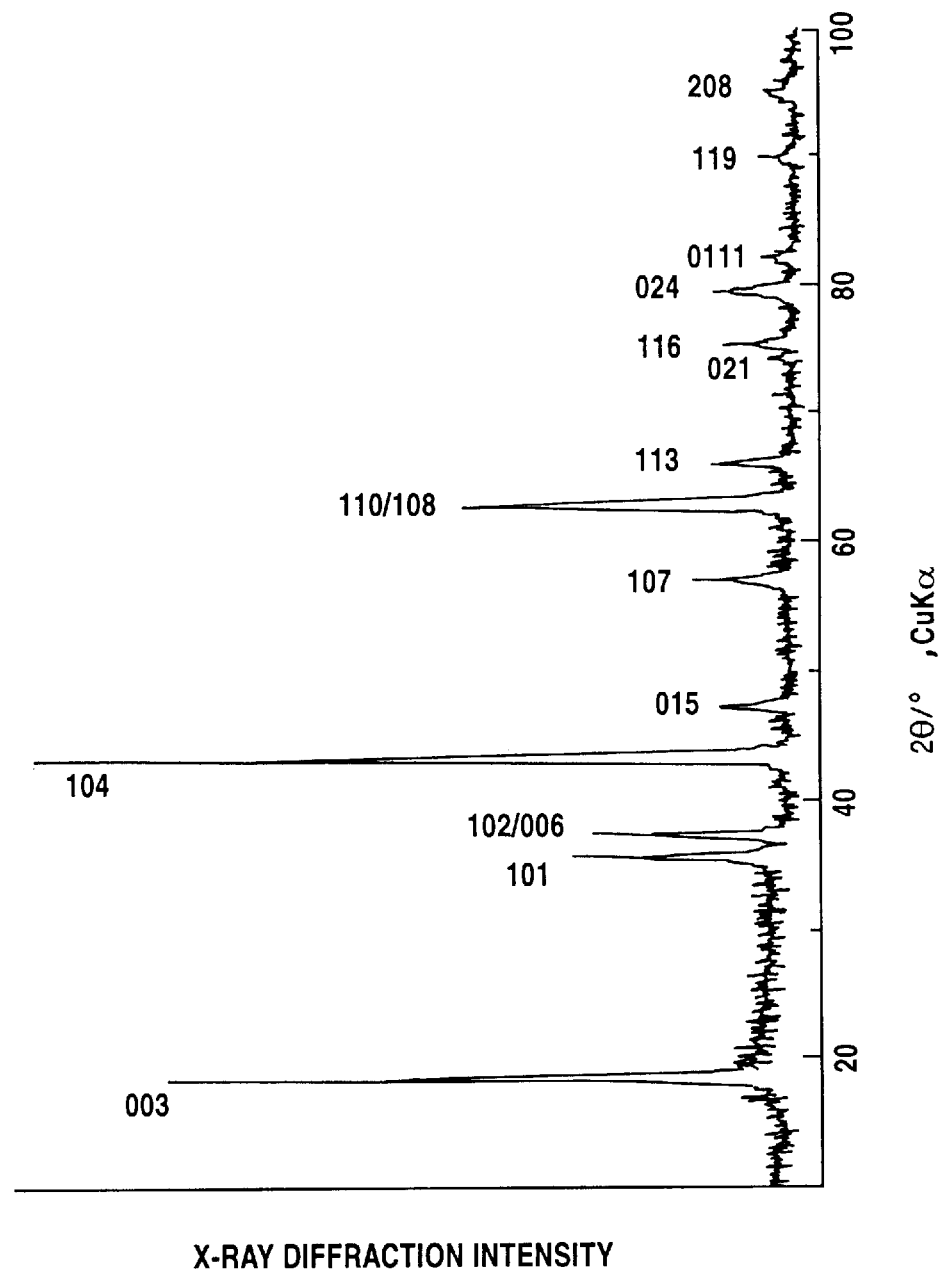
FIG. 1 is a pattern showing the result of Powder X-ray diffraction of $LiFeO_2$ obtained in Example 1 of the present invention.

5.4 g of iron chloride hexahydrate was weighed in a polytetrafluoroethylene beaker, and then admixed with 100 ml of distilled water, followed by sufficient stirring to completely dissolve it in water. Subsequently, 33 g (corresponding to about 8 mol/kg·$H_2O$) of lithium hydroxide monohydrate and 160 g (corresponding to about 40 mol/kg·$H_2O$) of sodium hydroxide were added to the resulting aqueous solution, followed by sufficient stirring. The mixture solution in the beaker was cooled to at most 100° C. because of considerable heat generation during the course of dissolution. Thereafter, the beaker was placed still in a hydrothermal reactor (autoclave), wherein a hydrothermal treatment was effected at 230° C. for 24 hours. When the temperature of the contents in the beaker was lowered to 100° C. after completion of the hydrothermal treatment, the beaker was taken out of the autoclave. The resulting powder was washed with distilled water to remove excesses of lithium hydroxide and sodium hydroxide, filtered, and dried to obtain a powdery product. The Powder X-ray diffraction pattern of this final product is shown in FIG. 1. As is apparent from FIG. 1, none of the residual α-$NaFeO_2$ and the like were recognized, while all diffraction peaks were assigned to a unit cell of hexagonal layered rock salt type $LiFeO_2$ as reported in the aforementioned "Referential Literature."

EXAMPLE 2

Figure 2:
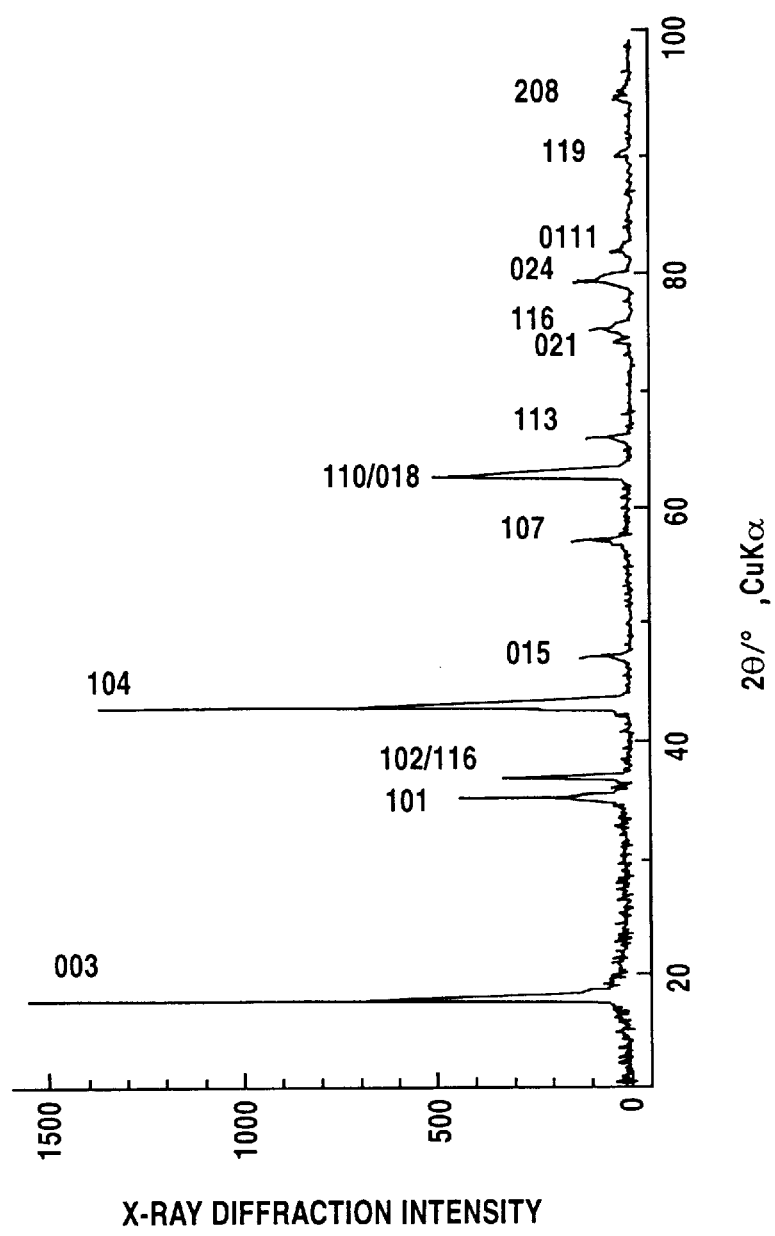
FIG. 2 is a pattern showing the result of Powder X-ray diffraction of $LiFeO_2$ obtained in Example 2 of the present invention.

50 g (corresponding to about 13 mol/kg·$H_2O$) of lithium hydroxide monohydrate and 166 g (corresponding to about 40 mol/kg·$H_2O$) of sodium hydroxide were placed in a polytetrafluoroethylene beaker, and then admixed with 100 ml of distilled water, followed by sufficient stirring to completely dissolve them in water. The mixed alkali solution in the beaker was cooled to at most 100° C. because of considerable heat generation during the course of dissolution. Thereafter, 2.7 g (corresponding to about 0.3 mol/kg·$H_2O$) of iron oxide hydroxide (α-FeOOH) was added to and well mixed with the cooled solution. Subsequently, the beaker was placed still in a hydrothermal reactor (autoclave), wherein a hydrothermal treatment was effected at 220° C. for 3 hours. When the temperature of the contents in the beaker was lowered to 100° C. after completion of the hydrothermal treatment, the beaker was taken out of the autoclave. The resulting powder was washed with distilled water to remove excesses of lithium hydroxide and sodium hydroxide, filtered, and dried to obtain a powdery product. The Powder X-ray diffraction pattern of this final product is shown in FIG. 2. As is apparent from FIG. 2, none of the residual α-$NaFeO_2$ and the like were recognized, while all diffraction peaks were assigned to a unit cell of hexagonal layered rock salt type $LiFeO_2$ as reported in the aforementioned "Referential Literature."

EXAMPLE 3

Figure 3:
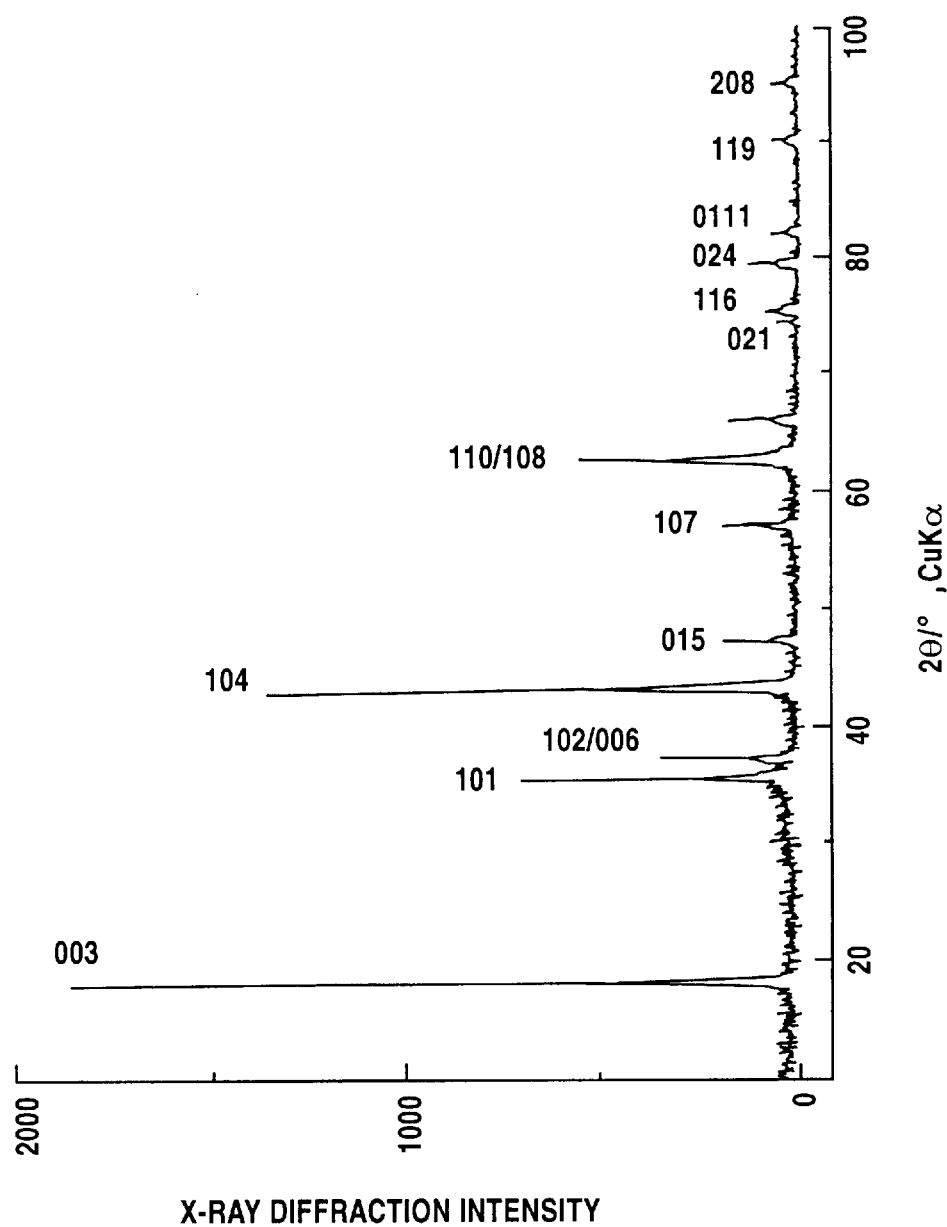
FIG. 3 is a pattern showing the result of Powder X-ray diffraction of $LiFeO_2$ obtained in Example 3 of the present invention.

50 g (corresponding to about 13 mol/kg·$H_2O$) of lithium hydroxide monohydrate and 309 g (corresponding to about 55 mol/kg·$H_2O$) of potassium hydroxide were placed in a polytetrafluoroethylene beaker, and then admixed with 100 ml of distilled water, followed by sufficient stirring to completely dissolve them in water. The mixed alkali solution in the beaker was cooled to at most 100° C. because of considerable heat generation during the course of dissolution. Thereafter, 2.7 g (corresponding to about 0.3 mol/kg·$H_2O$) of iron oxide hydroxide (α-FeOOH) was added to and well mixed with the cooled solution. Subsequently, the beaker was placed still in a hydrothermal reactor (autoclave), wherein a hydrothermal treatment was effected at 220° C. for 3 hours. When the temperature of the contents in the beaker was lowered to 100° C. after completion of the hydrothermal treatment, the beaker was taken out of the autoclave. The resulting powder was washed with distilled water to remove excesses of lithium hydroxide and potassium hydroxide, filtered, and dried to obtain a powdery product. The Powder X-ray diffraction pattern of this final product is shown in FIG. 3. As is apparent from FIG. 3, none of the residual α-$NaFeO_2$ and the like were recognized, while all diffraction peaks were assigned to a unit cell of hexagonal layered rock salt type $LiFeO_2$ as reported in the aforementioned "Referential Literature."

What is claimed is:

1. A process for preparing $LiFeO_2$ having a layered rock salt type structure; characterized in that at least one member selected from the group consisting of water-soluble iron salts, iron hydroxides, iron oxide hydroxides, and metallic iron is subjected to a hydrothermal treatment in an aqueous solution containing lithium hydroxide and sodium hydroxide and/or potassium hydroxide at 130° to 300° C.

2. A process for preparing $LiFeO_2$ having a layered rock salt type structure as claimed in claim 1, wherein a trivalent iron compound is used as the starting iron source material.

3. A process for preparing $LiFeO_2$ having a layered rock salt type structure as claimed in claim 1, wherein said aqueous solution has a concentration of the starting iron source material of 0.05 to 10M, a concentration of lithium hydroxide of 1 to 20 mol/kg·$H_2O$, and a concentration of at least one of sodium hydroxide and potassium hydroxide of 10 to 100 mol/kg·$H_2O$.

4. A process for preparing $LiFeO_2$ having a layered rock salt type structure as claimed in claim 2, wherein said aqueous solution has a concentration of the starting iron source material of 0.05 to 10M, a concentration of lithium hydroxide of 1 to 20 mol/kg·$H_2O$, and a concentration of at least one of sodium hydroxide and potassium hydroxide of 10 to 100 mol/kg·$H_2O$.

5. A process for preparing $LiFeO_2$ having a layered rock salt type structure as claimed in claim 1, wherein the hydrothermal treatment time is 0.5 to 336 hours.

6. A process for preparing $LiFeO_2$ having a layered rock salt type structure as claimed in claim 2, wherein the hydrothermal treatment time is 0.5 to 336 hours.

7. A process for preparing $LiFeO_2$ having a layered rock salt type structure as claimed in claim 3, wherein the hydrothermal treatment time is 0.5 to 336 hours.

8. A process for preparing $LiFeO_2$ having a layered rock salt type structure as claimed in claim 4, wherein the hydrothermal treatment time is 0.5 to 336 hours.

* * * * *